(12) United States Patent
Yang et al.

(10) Patent No.: US 12,479,969 B2
(45) Date of Patent: Nov. 25, 2025

(54) METHOD FOR PREPARING FLAME RETARDANT AID AND FLAME RETARDANT RESIN COMPOSITION COMPRISING FLAME RETARDANT AID PREPARED BY SAME

(71) Applicant: LG CHEM, LTD., Seoul (KR)

(72) Inventors: Hee Seung Yang, Daejeon (KR); Ki Young Nam, Daejeon (KR); Jae Young Sim, Daejeon (KR); Seon Hyeong Bae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 711 days.

(21) Appl. No.: 17/431,143

(22) PCT Filed: Sep. 22, 2020

(86) PCT No.: PCT/KR2020/012766
§ 371 (c)(1),
(2) Date: Aug. 13, 2021

(87) PCT Pub. No.: WO2021/060800
PCT Pub. Date: Apr. 1, 2021

(65) Prior Publication Data
US 2022/0135762 A1    May 5, 2022

(30) Foreign Application Priority Data

Sep. 27, 2019 (KR) .......... 10-2019-0120027
Sep. 15, 2020 (KR) .......... 10-2020-0118225

(51) Int. Cl.
| | |
|---|---|
| *C08K 3/016* | (2018.01) |
| *C08K 3/22* | (2006.01) |
| *C08K 5/00* | (2006.01) |
| *C08K 5/03* | (2006.01) |
| *C08L 35/06* | (2006.01) |
| *C09K 21/02* | (2006.01) |
| *C09K 21/08* | (2006.01) |

(52) U.S. Cl.
CPC .......... *C08K 3/016* (2018.01); *C08K 3/22* (2013.01); *C08K 5/0066* (2013.01); *C08K 5/03* (2013.01); *C08L 35/06* (2013.01); *C09K 21/02* (2013.01); *C09K 21/08* (2013.01); *C08K 2003/2296* (2013.01)

(58) Field of Classification Search
None
See application file for complete search history.

(56) References Cited

U.S. PATENT DOCUMENTS

| | | | | |
|---|---|---|---|---|
| 5,480,929 | A | * | 1/1996 | Miyata .......... C01B 13/366 524/436 |
| 5,571,526 | A | * | 11/1996 | Miyata .......... C01G 51/00 423/594.2 |
| 6,150,447 | A | | 11/2000 | Cusack et al. |
| 8,044,130 | B2 | * | 10/2011 | Miyamoto .......... C08K 9/06 428/407 |
| 2006/0234592 | A1 | | 10/2006 | Mio et al. |
| 2010/0227952 | A1 | | 9/2010 | Futterer et al. |
| 2010/0298474 | A1 | | 11/2010 | Futterer et al. |
| 2013/0178564 | A1 | * | 7/2013 | Yoo .......... C08L 33/20 524/521 |
| 2016/0090527 | A1 | | 3/2016 | Cho et al. |
| 2017/0121499 | A1 | * | 5/2017 | Pfaendner .......... C08K 5/3475 |

FOREIGN PATENT DOCUMENTS

| | | | |
|---|---|---|---|
| CN | 103865146 A | * 6/2014 | .......... C08K 13/02 |
| JP | H6-41441 A | 2/1994 | |
| JP | 2000-351906 A | 12/2000 | |
| JP | 3154535 B | 4/2001 | |
| JP | 2002030200 A | * 1/2002 | |
| JP | 2003-246894 A | 9/2003 | |
| KR | 10-1999-0073096 A | 10/1999 | |
| KR | 10-2003-0090936 A | 12/2003 | |
| KR | 10-2006-0007032 A | 1/2006 | |
| KR | 10-2010-0040313 A | 4/2010 | |
| KR | 10-2011-0087966 A | 8/2011 | |
| KR | 10-1522226 B | 5/2015 | |
| TW | 574305 B | 2/2004 | |
| WO | WO9700909 A | 1/1997 | |
| WO | WO-2013146222 A1 | * 10/2013 | .......... C01G 9/00 |

OTHER PUBLICATIONS

Nagendra et al. Polypropylene/Layered Double Hydroxide Nanocomposites: Influence of LDH Intralayer Metal Constituents on the Properties of Polypropylene. American Chemical Society, 2, 20-31 (Year: 2017).*
Yi et al. Synthesis and characterization of LDHs using Bayer red mud and its flame-retardant properties in EVA/LDHs composites. J. Mater Cycles Waste Manag, 17:646-654 (Year: 2015).*
Ling Yang et al., "Synthesis of Zinc Hydroxystannate Single-Crystalline Nanocubes and Its Flame Retardancy for Rigid PVC", Applied Mechanics and Materials, 2012, vol. 184, pp. 1307-1310.
K. Amarsingh Bhabu et al., "Synthesis and characterization of zinc stannate nanomaterials by sol-gel method", Materials Science Forum, 2015, vol. 832, pp. 144-157.
Z. Zaihang et al., "Synergistic effect of organically modified zinc aluminum layered double hydroxide in intumescent flame-retarding polypropylene composites containing melamine phytate and dipentaerythritol", Polymer Engineering and Science, vol. 59, No. 11, Sep. 13, 2019.
Supplementary Partial European Search Report for related Application No. 20867853.2, mailed Apr. 28, 2022.

(Continued)

*Primary Examiner* — Tanisha Diggs

(57) ABSTRACT

The present invention relates to a method for preparing a flame retardant aid, and a flame retardant resin composition including a flame retardant aid prepared by the same, wherein the method includes preparing a metal precursor solution by adding a zinc precursor and a precursor containing an M1 metal, and preparing a multi-component metal hydroxide by adding an acid or a base to the metal precursor solution to proceed with a sol-gel reaction.

9 Claims, 7 Drawing Sheets

(56) References Cited

OTHER PUBLICATIONS

Supplementary European Search Report for related Application No. 20867853.2, mailed Aug. 19, 2022.
Andre, F. et al., "The effect of zinc hydroxystannate and zinc stannate on the fire properties of polyester resins containing additive-type halogenated flame retardants", Polymer Degradation and Stability, Barking, GB, vol. 40, No. 2, Jan. 1, 1993, pp. 267-273, XP024144684, ISSN: 0141-3910, DOI: 10.1016/0141-3910 (93) 90215-5.
Horrocks, A. Richard et al., "Quantification of Zinc Hydroxystannate and Stannate Synergies in Halogen-containing Flame-retardant Polymeric Formulations", Journal of Fire Sciences, vol. 28, No. 3, Sep. 9, 2009, pp. 217-248, XP055913080, GB, ISSN: 0734-9041, DOI: 10.1177/0734904109344302.

* cited by examiner

METHOD FOR PREPARING FLAME RETARDANT AID AND FLAME RETARDANT RESIN COMPOSITION COMPRISING FLAME RETARDANT AID PREPARED BY SAME

CROSS-REFERENCE TO RELATED APPLICATIONS

This application is a National Phase of International Application No. PCT/KR2020/012766, which claims the benefit of Korean Patent Application Nos. 10-2019-0120027, filed on Sep. 27, 2019, and 10-2020-0118225, filed on Sep. 15, 2020, in the Korean Intellectual Property Office, the disclosures of which are incorporated herein in their entirety by reference.

TECHNICAL FIELD

The present invention relates to a method for preparing a flame retardant aid and a flame retardant resin composition including a flame retardant aid prepared by the same.

BACKGROUND ART

Thermoplastic resin compositions are applied to various fields from everyday household goods to electrical and electronic products such as automotive interior materials, office equipment, displays. In addition, flame retardant thermoplastic resins to which flame retardancy is imparted by adding a flame retardant to a thermoplastic resin composition in order to be applied to heat generating products or high voltage products are used in various fields.

Flame retardants are typically classified into halogen-based flame retardants and non-halogen-based flame retardants, and bromine-based flame retardants are representative of the halogen-based flame retardants. Bromine-based flame retardants have excellent flame retardancy even in thin films. In addition, when used in combination with antimony trioxide, which is a flame retardant aid, the bromine-based flame retardants have excellent flame retardant effects even when a small amount of antimony trioxide is added thereto.

However, antimony trioxide which is used as a flame retardant aid is classified as a first-class carcinogen, so there is a demand for the development of a new flame retardant aid to replace the same. To this end, there have been attempts to use other metal oxides such as $Fe_2O_3$, $MoO_2$, and $Bi_2O_3$ as flame retardant aids. However, these metal oxides have low flame retardant efficiency and have a unique color of inorganic substances, and thus, are limited in application.

DISCLOSURE OF THE INVENTION

Technical Problem

An aspect of the present invention provides a method for preparing a flame retardant aid, and a flame retardant resin composition including a flame retardant aid prepared by the preparation method, wherein the flame retardant aid does not include a carcinogen, and is applied to a thermoplastic resin composition together with a halogen-based flame retardant, thereby exhibiting excellent flame retardant efficiency.

Technical Solution

According to an aspect of the present invention, there is provided a method for preparing a flame retardant aid, the method including preparing a metal precursor solution by adding a zinc precursor and a precursor containing an $M^1$ metal to a solvent, and preparing a multi-component metal hydroxide represented by Formula 1 below by adding an acid or a base to the metal precursor solution to proceed with a sol-gel reaction.

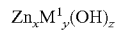   [Formula 1]

In Formula 1 above, $M^1$ is one or more selected from the group consisting of transition metals, alkaline earth metals, and Group 13 to 16 metals excluding zinc, x and y each represent the atomic ratio of Zn and $M^1$, x:y is 0.5 to 2.0:0.1 to 3.0, and $2 \leq z \leq 6$.

According to another aspect of the present invention, there is provided a flame retardant resin composition including a base resin, a halogen-based flame retardant, and a flame retardant aid, wherein the flame retardant aid is a multi-component metal hydroxide represented by Formula 1 above.

Advantageous Effects

A method for preparing a flame retardant aid according to the present invention is a method for forming a flame retardant aid in the form of a hydroxide including two or more metal components through a sol-gel process. When a flame retardant aid is prepared through a sol-gel process as in the present invention, it is possible to adjust the metal component and content in the flame retardant aid variously, and to prepare a flame retardant aid having excellent particle size uniformity.

In addition, when using a typical method for preparing a metal hydroxide, such as a hydrothermal synthesis method, mass production is impossible. However, according to the preparation method of the present invention, mass production is possible, so that economic feasibility is excellent.

A flame retardant aid prepared according to the method of the present invention has high particle size uniformity, and thus, is excellent in dispersibility when mixed with a thermoplastic resin, and has excellent flame retardancy and thermal stability improvement effect.

In addition, a flame retardant resin composition including the flame retardant aid prepared according to the method of the present invention does not use an antimony-based flame retardant aid which generate carcinogens, and thus, is environmentally friendly and safe and exhibits excellent flame retardant performance. Also, when using the flame retardant aid prepared according to the method of the present invention, it is possible to obtain an effect of preventing thermal stability degradation due to the decomposition of a halogen-based flame retardant.

BEST MODE FOR CARRYING OUT THE INVENTION

Figure 1:
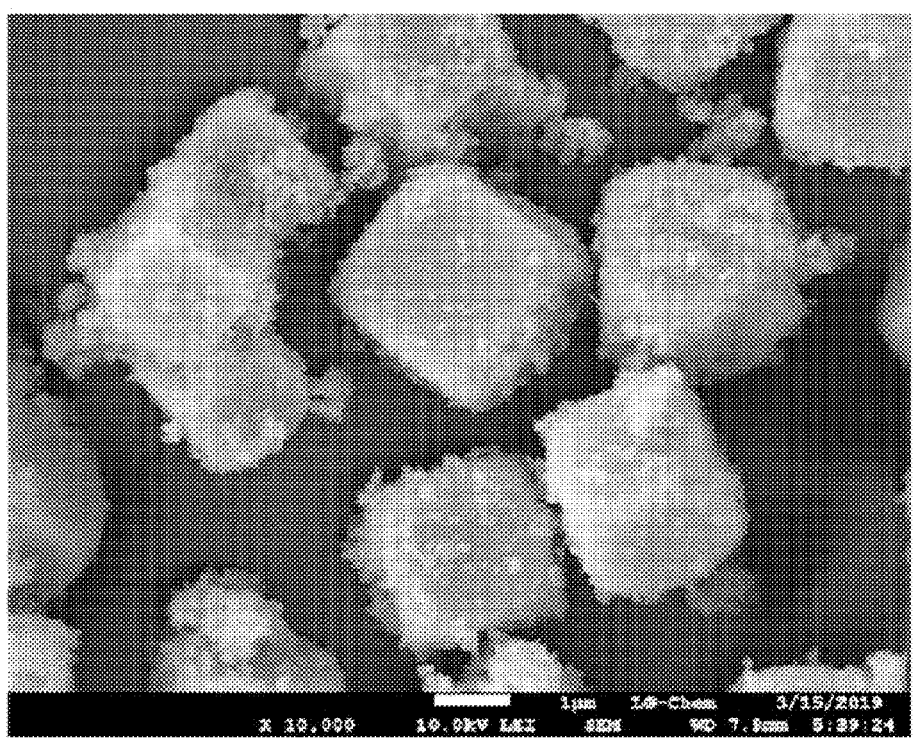
FIG. 1 is an SEM photograph of Zn—Sn hydroxide particles prepared in Example 1.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include" or "have" are intended to specify the presence of stated features, numbers, steps, elements, or combinations thereof, but do not preclude the presence or addition of one or more other features, numbers, steps, elements, or combinations thereof.

Hereinafter, the present invention will be described in detail.

Method for Preparing Flame Retardant Aid

The present invention relates to a method for preparing a flame retardant aid which may replace an antimony-based flame retardant aid, and specifically, to a method for forming a flame retardant aid in the form of a multi-component metal hydroxide including two or more metal components through a sol-gel process.

The method for preparing a flame retardant aid of the present invention includes (1) preparing a metal precursor solution by adding a zinc precursor and a precursor containing an $M^1$ metal to a solvent, and (2) preparing a multi-component metal hydroxide represented by Formula 1 below by adding an acid or a base to the metal precursor solution to proceed with a sol-gel reaction.

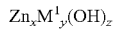
$Zn_xM^1_y(OH)_z$ [Formula 1]

In Formula 1 above, $M^1$ is one or more selected from the group consisting of transition metals, alkaline earth metals, and Group 13 to 16 metals excluding zinc, x and y each represent the atomic ratio of Zn and $M^1$, x:y is 0.5 to 2.0:0.1 to 3.0, and $2 \leq z \leq 6$.

First, a metal precursor solution is prepared by adding a zinc precursor and a precursor containing an $M^1$ metal to a solvent. The $M^1$ metal may be one or more selected from the group consisting of transition metals, alkaline earth metals, and Group 13 to 16 metals excluding zinc, and may specifically be one or more selected from the group consisting of Sn, Al, Ti, Nb, Fe, Co, Ni, Cu, Zr, Mo, Pd, Sc, Cd, Mg, Ca, Sr, Si, and Sb.

At this time, the solvent is not limited to any specific type as long as it is capable of dissolving a zinc precursor and a precursor containing an $M^1$ metal. For example, the solvent may be deionized water, ethanol, methanol, isopropanol, acetonitrile, dimethylamine borane, or a mixture thereof, but is not limited thereto.

The zinc precursor may be, for example, zinc chloride, zinc sulfate, zinc acetate, zinc nitrate, zinc sulfide, or a mixture thereof, and the precursor containing an $M^1$ metal may be chloride, sulfur oxide, nitrate, sulfide, acetate of the $M^1$ metal, or a mixture thereof. Specifically, the precursor containing an $M^1$ metal may be chloride, sulfur oxide, nitrate, sulfide, and acetate of Sn, Al, Ti, Nb, Fe, Co, Ni, Cu, Zr, Mo, Pd, Sc, Cd, Mg, Ca, Sr, Si or Sb, or a mixture thereof.

Meanwhile, the metal precursor solution may include the zinc precursor and the precursor containing an $M^1$ metal in an amount such that the atomic ratio of zinc $M^1$ metal is 0.5 to 2.0:0.1 to 3.0, preferably 0.5 to 2.0:0.1 to 2.0, more preferably 0.7 to 1.3:0.2 to 1.3. When the addition amount of a zinc precursor and a precursor containing an $M^1$ metal in a metal precursor solution satisfies the above range, a flame retardant aid having an excellent flame retardant efficiency and an excellent thermal stability improvement effect may be prepared.

A zinc precursor and a precursor containing an $M^1$ metal are added to a solvent, and then stirred and mixed so as to be dissolved well in the solvent. A metal precursor solution is prepared thereby.

Next, an acid or a base is added to the metal precursor solution to adjust the pH thereof, thereby proceeding with a sol-gel reaction.

The acid or the base is added to adjust the pH of the metal precursor solution, and an acid or a base well known in the art may be used. For example, acetic acid, sodium hydroxide, ammonium hydroxide, calcium hydroxide, and the like may be used, but the present invention is not limited thereto.

Meanwhile, when an acid is applied to adjust the pH, the acid may be added in an amount such that the pH of the metal precursor solution is 2 to 4. When a base is applied to adjust the pH, the base may be added in an amount such that the pH of the metal precursor solution is 8 to 10.

When stirring is performed after the pH of the metal precursor solution is adjusted through the addition of an acid or a base, hydrolysis occurs, causing a sol-gel reaction, and as the result of the reaction, a multi-component hydroxide particles represented by Formula 1 below and containing zinc and an $M^1$ metal are formed.

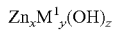
$Zn_xM^1_y(OH)_z$ [Formula 1]

In Formula 1 above, $M^1$ is one or more selected from the group consisting of transition metals, alkaline earth metals, and Group 13 to 16 metals excluding Zn, and may preferably be one or more selected one or more selected from the group consisting of Sn, Al, Ti, Nb, Fe, Co, Ni, Cu, Zr, Mo, Pd, Sc, Cd, Mg, Ca, Sr, Si, and Sb.

x and y each represent the atomic ratio of Zn and $M^1$, and x:y is 0.5 to 2.0:0.1 to 3.0, preferably 0.5 to 2.0:0.1 to 2.0. More preferably, x:y may be 0.7 to 1.3:0.2 to 1.3.

z represents the molar ratio of OH and satisfies $2 \leq z \leq 6$.

Specifically, the multi-component metal hydroxide may be represented by [Formula 2] below.

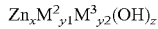
$Zn_xM^2_{y1}M^3_{y2}(OH)_z$ [Formula 2]

In Formula 2 above, $M^2$ is one or more selected from the group consisting of Sn and Al, and $M^3$ is one or more selected from the group consisting of transition metals, alkaline earth metals, and Group 13 to 16 metals excluding Zn, Sn, and Al, and may preferably be one or more selected from the group consisting of Ti, Nb, Fe, Co, Ni, Cu, Zr, Mo, Pd, Sc, Cd, Mg, Ca, Sr, Si, and Sb.

x, y1, and y2 each represent the atomic ratio of Zn, $M^2$, and $M^3$, and x:y1:y2 may be 0.5 to 2.0:0.1 to 3.0:0 to 2.9, preferably 0.5 to 2.0:0.1 to 2.0:0 to 1.9, and more preferably 0.7 to 1.3:0.2 to 1.3:0 to 1.1.

z represents the molar ratio of OH and satisfies $2 \leq z \leq 6$.

More specifically, the multi-component metal hydroxide may be a metal hydroxide containing two or three metal elements, and may be, for example, of $Zn_xSn_y(OH)_z$, $Zn_xAl_y(OH)_z$, $Zn_xSn_{y1}Al_{y2}(OH)_z$, $Zn_xSn_{y1}Ti_{y2}(OH)_z$, $Zn_xSn_{y1}Fe_{y2}(OH)_z$, $Zn_xSn_{y1}Fe_{y2}(OH)_z$, $Zn_xSn_{y1}Ti_{y2}(OH)_z$, $Zn_xSn_{y1}Co_{y2}(OH)_z$, $Zn_xSn_{y1}Ni_{y2}(OH)_z$, $Zn_xSn_{y1}Zr_{y2}(OH)_z$, $Zn_xSn_{y1}Mo_{y2}(OH)_z$, $Zn_xSn_{y1}Pd_{y2}(OH)_z$, $Zn_xSn_{y1}Sc_{y2}(OH)_z$, $Zn_xSn_{y1}Cd_{y2}(OH)_z$, $Zn_xSn_{y1}Mg_{y2}(OH)_z$, $Zn_xSn_{y1}Ca_{y2}(OH)_z$, $Zn_xSn_{y1}Sr_{y2}(OH)_z$, $Zn_xSn_{y1}Si_{y2}(OH)_z$, $Zn_xSn_{y1}Sb_{y2}(OH)_z$, $Zn_xAl_{y1}Ti_{y2}(OH)_z$, $Zn_xAl_{y1}Fe_{y2}(OH)_z$, $Zn_xAl_{y1}Fe_{y2}(OH)_z$, $Zn_xAl_{y1}Ti_{y2}(OH)_z$, $Zn_xAl_{y1}Co_{y2}(OH)_z$, $Zn_xAl_{y1}Ni_{y2}(OH)_z$, $Zn_xAl_{y1}Zr_{y2}(OH)_z$, $Zn_xAl_{y1}Mo_{y2}(OH)_z$, $Zn_xAl_{y1}Pd_{y2}(OH)_z$, $Zn_xAl_{y1}Sc_{y2}(OH)_z$, $Zn_xAl_{y1}Cd_{y2}(OH)_z$, $Zn_xAl_{y1}Mg_{y2}(OH)_z$, $Zn_xAl_{y1}Ca_{y2}(OH)_z$, $Zn_xAl_{y1}Sr_{y2}(OH)_z$, $Zn_xAl_{y1}Si_{y2}(OH)_z$, $Zn_xAl_{y1}Sb_{y2}(OH)_z$ (wherein, x, y, y1, y2, and z are the same as defined in Formula 1 or Formula 2), or the like, but is not limited thereto.

When multi-component metal hydroxide particles are formed through the above process, the formed multi-component metal hydroxide particles are precipitated, and then a supernatant is removed therefrom. The remaining particles are washed and dried to obtain a multi-component metal hydroxide.

When used with a flame retardant, the multi-component metal hydroxide prepared according to the present invention has an effect of improving the flame retardancy and thermal stability of a thermoplastic resin, and thus, may be usefully used a flame retardant aid.

Meanwhile, a multi-component metal hydroxide has been typically prepared through a hydrothermal synthesis method. However, the hydrothermal synthesis method is limited in that mass production is difficult, and thus, economic feasibility is poor. In addition, when the hydrothermal synthesis method is used, the composition of metal components in a multi-component metal hydroxide is formed to satisfy the stoichiometry, and a non-stoichiometric compound cannot be prepared. Therefore, it has been difficult to prepare a metal hydroxide having various composition ratios.

On the other hand, when a multi-component metal hydroxide is prepared through a sol-gel process as in the present invention, not only mass production is possible, but also a compound having a non-stoichiometric metal composition may be formed by adjusting the addition amount and/or reaction conditions of a precursor. Therefore, a desired flame retardant aid with optimized performance may be provided by adjusting the metal composition in the multi-component metal hydroxide in consideration of a thermoplastic resin to be applied, the application thereof, or the like.

In addition, the multi-component metal hydroxide prepared according to the method of the present invention has an uniform particle size distribution compared to a multi-component metal hydroxide prepared by hydrothermal synthesis, and has excellent dispersibility when mixed with a thermoplastic resin since an additive such as a surfactant is not used in the preparation process. As a result, when applied to a flame retardant resin composition, it is possible to maximize the flame retardant synergistic effect and thermal stability improvement effect.

Flame Retardant Resin Composition

Next, a flame retardant resin composition according to the present invention will be described. The flame retardant resin composition of the present invention includes (1) a base resin, (2) a flame retardant, and (3) a flame retardant aid.

(1) Base Resin

In the present invention, various thermoplastic resins which are applied to a flame retardant resin composition in the art may be used as the base resin. For example, a rubbery polymer resin, an aromatic vinyl resin, a polycarbonate resin, a polyolefin resin, an acrylic resin, or a mixture thereof may be used without limitation, and the type of the base resin is not particularly limited.

Specifically, the flame retardant resin composition of the present invention may include a base resin including a conjugated diene-based graft copolymer and a matrix copolymer in which the conjugated diene-based graft copolymer is dispersed.

At this time, the graft copolymer may be a copolymer in which an aromatic vinyl-based monomer and a vinyl cyan-based monomer are graft-polymerized to a conjugated diene-based polymer.

The graft copolymer may be prepared through a typical graft polymerization method commonly known in the art, and specifically, may be prepared by a method in which emulsion polymerization, suspension polymerization, or bulk polymerization is performed on an aromatic vinyl-based monomer and a vinyl cyan-based monomer in the presence of a conjugated diene-based polymer.

At this time, the conjugated diene-based polymer refers to a copolymer prepared by polymerizing a conjugated diene-based monomer, and the conjugated diene-based monomer may be one or more selected from the group consisting of butadiene, isoprene, and chloroisoprene. Among the above, butadiene may be preferable.

The conjugated diene-based polymer used in the present invention may have an average particle diameter of 0.1 to 1.0 µm, 0.1 to 0.5 µm, or 0.1 to 0.3 µm. Among the above, 0.1 to 0.3 µm is preferable. When the average particle diameter of a conjugated diene-based polymer satisfies the above range, the mechanical properties, gloss properties, and coloring properties of a graft copolymer may be further improved.

Meanwhile, two or more types of conjugated diene-based polymers having different average particle diameters within the above-described particle diameter range may be mixed and used as the conjugated diene-based polymer.

Meanwhile, in the present invention, an average particle diameter may be defined as a particle diameter corresponding to 50% or greater of the volume accumulation in a particle diameter distribution curve of a particle. In the present invention, the average particle diameter of a conjugated diene-based polymer may be measured after dissolving a certain amount of the conjugated diene polymer in a solvent. Specifically, the average particle diameter of a conjugated diene-based polymer may be measured using a Coulter counter (product name: LS230, manufacturer: Beckman Coulter) after dissolving 0.5 g of the conjugated diene-based polymer in 100 ml of methyl ethyl ketone.

The aromatic vinyl-based monomer is one or more selected from the group consisting of styrene, α-methylstyrene, 2-methylstyrene, 3-methylstyrene, 4-methylstyrene, 2-ethylstyrene, 3-ethylstyrene, and 4-ethylstyrene. Among the above, styrene is particularly preferable.

The vinyl cyan-based monomer may be one or more selected from the group consisting of acrylonitrile, methacrylonitrile, and ethacrylonitrile. Among the above, acrylonitrile is preferable.

The graft copolymer of the present invention may include 50 to 65 wt % of a conjugated diene-based polymer, 25 to 35 wt % of a unit derived from an aromatic vinyl-based monomer, and 5 to 20 wt % of a unit derived from a vinyl cyan-based monomer. When the above range is satisfied, the mechanical properties, gloss properties, and coloring properties a graft copolymer may be improved, and the rigidity, processability, surface gloss, chemical resistance, and weather resistance of a flame retardant resin composition may be further improved.

The graft copolymer may have a graft rate of 30 to 70%, 40 to 60%, or 40 to 50%. Among the above, 40 to 50% is preferable. When the above range is satisfied, it is possible to find a balance between the thermal stability and mechanical properties of the graft copolymer.

Here, a graft rate may be calculated using the following formula after adding a certain amount of a graft copolymer to a solvent, dissolving the same using a vibrator, and performing centrifugation with a centrifugal separator, followed by drying to obtain an insoluble matter. Specifically, the graft rate may be calculated using the following formula after adding a certain amount of a graft copolymer to acetone and vibrating the mixture with a vibrator (product name: SI-600R, manufacturer: Lab.companion) for 24 hours to dissolve a loose graft copolymer. Thereafter, centrifugation is performed with a centrifugal separator for 1 hour at 14,000 rpm, followed by drying with a vacuum dryer (product name: DRV320DB, manufacturer: ADVANTEC) for 2 hours at 140° C. to obtain an insoluble matter.

Graft rate (%)=[(Y-(X×R))/(X×R)]×100

Y: Weight of insoluble matter
X: Weight of graft copolymer added when obtaining insoluble matter
R: Fraction of conjugated diene-based polymer in graft copolymer added when obtaining insoluble matter Meanwhile, the matrix copolymer may be a copolymer of an aromatic vinyl-based monomer and a vinyl cyan-based monomer.

At this time, the aromatic vinyl-based monomer may be one or more selected from the group consisting of styrene, α-methylstyrene, 2-methylstyrene, 3-methylstyrene, 4-methylstyrene, 2-ethylstyrene, 3-ethylstyrene, and 4-ethylstyrene. Among the above, styrene is particularly preferable.

The vinyl cyan-based monomer may be one or more selected from the group consisting of acrylonitrile, methacrylonitrile, and ethacrylonitrile. Among the above, acrylonitrile is preferable.

It is preferable that an aromatic vinyl-based monomer and a vinyl cyan-based monomer included in a matrix copolymer of the present invention are included at a weight ratio of 6:4 to 9:1. When the above range is satisfied, color, rigidity, processability, productivity, chemical resistance, and weather resistance may be excellent.

Meanwhile, the base resin may include a graft copolymer and a matrix copolymer at a weight ratio of 1:9 to 9:1, preferably 1:9 to 6:4, and more preferably 1:9 to 4:6. When a graft copolymer is included less than the above, impact strength is reduced, and thus, a product may break during the injection and assembly process thereof. When included greater than the above, scratch resistance and processability may become poor.

(2) Flame Retardant

The flame retardant is to provide flame retardancy to a flame retardant resin composition, and may be a halogen-based flame retardant typical used in the art.

Specific examples of the halogen-based flame retardant may be hexabromocyclododecane, tetrabromocyclooctane, monochloro petabromocyclohexane, decabromodiphenyl oxide, octabromodiphenyl oxide, decabromodiphenyl ethane, ethylene bis(tetrabromophthalimide), tetrabromobisphenyl A, brominated epoxy oligomers, bis(tribromophenoxy)ethane, 2,4,6-tris(2,4,6-tribromophenoxy)-1,3,5-triazine, and tetrabromobisphenol A bis(allyl ether), but are not limited thereto.

The flame retardant may be included in an amount of 10 to 30 parts by weight, preferably 10 to 30 parts by weight, and more preferably 10 to 25 parts by weight based on 100 parts by weight of a base resin. When the content of the flame retardant satisfies the above range, flame retardancy may be effectively improved without adversely affecting the physical properties of the base resin.

(3) Preparing Flame Retardant Aid

The flame retardant aid is to increase the flame retardant effect of a flame retardant. In the present invention, a multi-component metal hydroxide represented by Formula 1 below and prepared according to the method of the present invention described above is used as the flame retardant aid.

$$Zn_xM^1{}_y(OH)_z$$ [Formula 1]

In Formula 1 above, $M^1$ is one or more selected from the group consisting of transition metals, alkaline earth metals, and Group 13 to 16 metals excluding zinc, x and y each represent the atomic ratio of Zn and $M^1$, x:y is 0.5 to 2.0:0.1 to 3.0, and $2 \leq z \leq 6$.

Preferably, $M^1$ may be one or more selected from the group consisting of Sn, Al, Ti, Nb, Fe, Co, Ni, Cu, Zr, Mo, Pd, Sc, Cd, Mg, Ca, Sr, Si, and Sb, and x:y may be 0.5 to 2.0:0.1 to 2.0, more preferably 0.7 to 1.3:0.2 to 1.3.

Specifically, the multi-component metal hydroxide may be represented by [Formula 2] below.

$$Zn_xM^2{}_{y1}M^3{}_{y2}(OH)_z$$ [Formula 2]

In Formula 2 above, $M^2$ is one or more selected from the group consisting of Sn and Al, and $M^3$ is one or more selected from the group consisting of transition metals, alkaline earth metals, and Group 13 to 16 metals excluding Zn, Sn, and Al, and may preferably be one or more selected from the group consisting of Ti, Nb, Fe, Co, Ni, Cu, Zr, Mo, Pd, Sc, Cd, Mg, Ca, Sr, Si, and Sb.

x, y1, and y2 each represent the atomic ratio of Zn, $M^2$, and $M^3$, and x:y1:y2 may be 0.5 to 2.0:0.1 to 3.0:0 to 2.9, preferably 0.5 to 2.0:0.1 to 2.0:0 to 1.9, and more preferably 0.7 to 1.3:0.2 to 1.3:0 to 1.1.

z represents the molar ratio of OH and satisfies $2 \leq z \leq 6$.

More specifically, the multi-component metal hydroxide may be a metal hydroxide containing two or three metal elements, and may be, for example, $Zn_xSn_y(OH)_z$, $Zn_xAl_y(OH)_z$, $Zn_xSn_{y1}Al_{y2}(OH)_z$, $Zn_xSn_{y1}Ti_{y2}(OH)_z$, $Zn_xSn_{y1}Fe_{y2}(OH)_z$, $Zn_xSn_{y1}Fe_{y2}(OH)_z$, $Zn_xSn_{y1}Ti_{y2}(OH)_z$, $Zn_xSn_{y1}Co_{y2}(OH)_z$, $Zn_xSn_{y1}Ni_{y2}(OH)_z$, $Zn_xSn_{y1}Zr_{y2}(OH)_z$, $Zn_xSn_{y1}Mo_{y2}(OH)_z$, $Zn_xSn_{y1}Pd_{y2}(OH)_z$, $Zn_xSn_{y1}Sc_{y2}(OH)_z$, $Zn_xSn_{y1}Cd_{y2}(OH)_z$, $Zn_xSn_{y1}Mg_{y2}(OH)_z$, $Zn_xSn_{y1}Ca_{y2}(OH)_z$, $Zn_xSn_{y1}Sr_{y2}(OH)_z$, $Zn_xSn_{y1}Si_{y2}(OH)_z$, $Zn_xSn_{y1}Sb_{y2}(OH)_z$, $Zn_xAl_{y1}Ti_{y2}(OH)_z$, $Zn_xAl_{y1}Fe_{y2}(OH)_z$, $Zn_xAl_{y1}Fe_{y2}(OH)_z$, $Zn_xAl_{y1}Ti_{y2}(OH)_z$, $Zn_xAl_{y1}Co_{y2}(OH)_z$, $Zn_xAl_{y1}Ni_{y2}(OH)_z$, $Zn_xAl_{y1}Zr_{y2}(OH)_z$, $Zn_xAl_{y1}Mo_{y2}(OH)_z$, $Zn_xAl_{y1}Pd_{y2}(OH)_z$, $Zn_xAl_{y1}Sc_{y2}(OH)_z$, $Zn_xAl_{y1}Cd_{y2}(OH)_z$, $Zn_xAl_{y1}Mg_{y2}(OH)_z$, $Zn_xAl_{y1}Ca_{y2}(OH)_z$, $Zn_xAl_{y1}Sr_{y2}(OH)_z$, $Zn_xAl_{y1}Si_{y2}(OH)_z$, $Zn_xAl_{y1}Sb_{y2}(OH)_z$ (wherein, x, y, y1, y2, and z are the same as defined in Formula 1 or Formula 2), or the like, but is not limited thereto.

The multi-component metal hydroxide prepared according to the method of the present invention has high particle size uniformity, and thus, is excellent in dispersibility when mixed with a thermoplastic resin. In addition, when used together with a halogen-based flame retardant, the multi-component metal hydroxide has an excellent flame retardant synergistic effect and prevents discoloration due to the decomposition of the flame retardant when staying at a high temperature, thereby enabling excellent flame retardancy and thermal stability to be implemented.

The flame retardant aid may be included in an amount of 1 to 10 parts by weight, preferably 1 to 5 parts by weight based on 100 parts by weight of a base resin. When the content of the flame retardant aid satisfies the above range, flame retardancy and thermal stability may be effectively improved without adversely affecting the physical properties of the base resin.

A flame retardant resin composition including the flame retardant aid of the present invention as described above does not use an antimony-based flame retardant aid which generates carcinogens. Therefore, the flame retardant resin composition is not only environmentally friendly and safe and exhibits excellent flame retardant performance, but also has excellent thermal stability and less discoloration even after staying at a high temperature.

(4) Additive

The flame retardant resin composition according to the present invention may further include, when needed, one or more additives selected from the group consisting of an impact modifier, a lubricant, an anti-dripping agent, an antioxidant, a light stabilizer, a sunscreen, a pigment, and an inorganic filler.

Specific materials of the additive may not be particularly limited as long as they are is used in a thermoplastic flame retardant resin composition. For example, as the anti-dripping agent, one or more selected from the group consisting of Teflon, polyamide, polysilicon, polytetrafluoroethylene (PTFE) and a tetrafluoroethylene-hexafluoropropylene (TFE-HFP) copolymer may be used in terms of further improving flame retardancy, and as the inorganic filler, one or more selected from the group consisting of barium sulfate, a barium glass filler, and a barium oxide may be used.

MODE FOR CARRYING OUT THE INVENTION

Hereinafter, the present invention will be described in detail with reference to specific examples.

Example 1

<Preparing Flame Retardant Aid>

0.5 M of $ZnCl_2$ and 0.25 M of $SnCl_2$ were added to 750 mL of ethanol, and then were melted by being stirred with a magnetic bar until the mixture became transparent. Thereafter, 750 mL of 3.2 M NaOH aqueous solution was slowly injected thereto for 15 minutes to induce a sol-gel reaction. When a white particle phase was formed by a hydrolysis reaction caused by the addition of the NaOH aqueous solution, the mixture was stirred rapidly for 1 hour, and then precipitated for 12 hours without being stirred. A reaction solution in the upper layer was drained out of the precipitated reactant. Thereafter, the remaining reactant was sufficiently washed with water and ethanol for 10 minutes at 10000 rpm using a centrifugal separator, and then dried in an oven for 12 hours at 80° C. to obtain Zn—Sn hydroxide particles.

<Preparing Flame Retardant Resin Composition>

An ABS copolymer (product name: DP270, LG Chem) and a SAN resin (product name: 90HR, LG Chem) were mixed at a weight ratio of 3:7 to prepare a base resin. Based on 100 parts by weight of the prepared base resin, 16 parts by weight of tetrabromobisphenol A (TBBA) as a flame retardant and 3 parts by weight of Zn—Sn hydroxide particles prepared above as a flame retardant aid were mixed to prepare a flame retardant resin composition.

Example 2

<Preparing Flame Retardant Aid>

1 M of $ZnCl_2$ and 0.6 M of $AlCl_3$ were added to 300 mL of distilled water and 700 mL of ethanol, and then were melted by being stirred with a magnetic bar until the mixture became transparent. Thereafter, 750 mL of 3.5 M NaOH aqueous solution was slowly injected thereto for 20 minutes to induce a sol-gel reaction. When a white particle phase was formed by a hydrolysis reaction caused by the addition of the NaOH aqueous solution, the mixture was stirred rapidly for 30 minutes, and then precipitated for 4 hours without being stirred. A reaction solution in the upper layer was drained out of the precipitated reactant. Thereafter, the remaining reactant was sufficiently washed with water and ethanol for 10 minutes at 10000 rpm using a centrifugal separator, and then dried in an oven for 12 hours at 80° C. to obtain Zn—Al hydroxide particles.

<Preparing Flame Retardant Resin Composition>

An ABS copolymer (product name: DP270, LG Chem) and a SAN resin (product name: 90HR, LG Chem) were mixed at a weight ratio of 3:7 to prepare a base resin. Based on 100 parts by weight of the prepared base resin, 16 parts by weight of tetrabromobisphenol A (TBBA) as a flame retardant and 3 parts by weight of Zn—Al hydroxide particles prepared above as a flame retardant aid were mixed to prepare a flame retardant resin composition.

Comparative Example 1

An ABS copolymer (product name: DP270, LG Chem) and a SAN resin (product name: 90HR, LG Chem) were mixed at a weight ratio of 3:7 to prepare a base resin. Based on 100 parts by weight of the prepared base resin, 16 parts by weight of tetrabromobisphenol A (TBBA) as a flame retardant and 3 parts by weight of $Sb_2O_3$ as a flame retardant aid were mixed to prepare a flame retardant resin composition.

Comparative Example 2

An ABS copolymer (product name: DP270, LG Chem) and a SAN resin (product name: 90HR, LG Chem) were mixed at a weight ratio of 3:7 to prepare a base resin. Based on 100 parts by weight of the prepared base resin, 16 parts by weight of tetrabromobisphenol A (TBBA) as a flame retardant, 3 parts by weight of $Sb_2O_3$ as a flame retardant aid, and 0.2 parts by weight of a stabilizer were mixed to prepare a flame retardant resin composition.

Experimental Example 1

The shape of the Zn—Sn hydroxide particles prepared in Example 1 and the shape of the Zn—Al hydroxide particles prepared in Example 2 were observed through a scanning electron microscope (SEM).

In addition, through Energy Dispersive X-ray spectroscopy (EDS) component analysis, the component distribution and composition ratio of the Zn—Sn hydroxide particles prepared in Example 1 and the Zn—Al hydroxide particles prepared in Example 2 were identified.

FIG. 1 is an SEM photograph of the Zn—Sn hydroxide particles prepared in Example 1. As shown in FIG. 1, the Zn—Sn hydroxide particles prepared in Example 1 were particles in a cubic form having a particle diameter of about 2 μm, and were found to have a relatively uniform particle size distribution.

Figure 2:
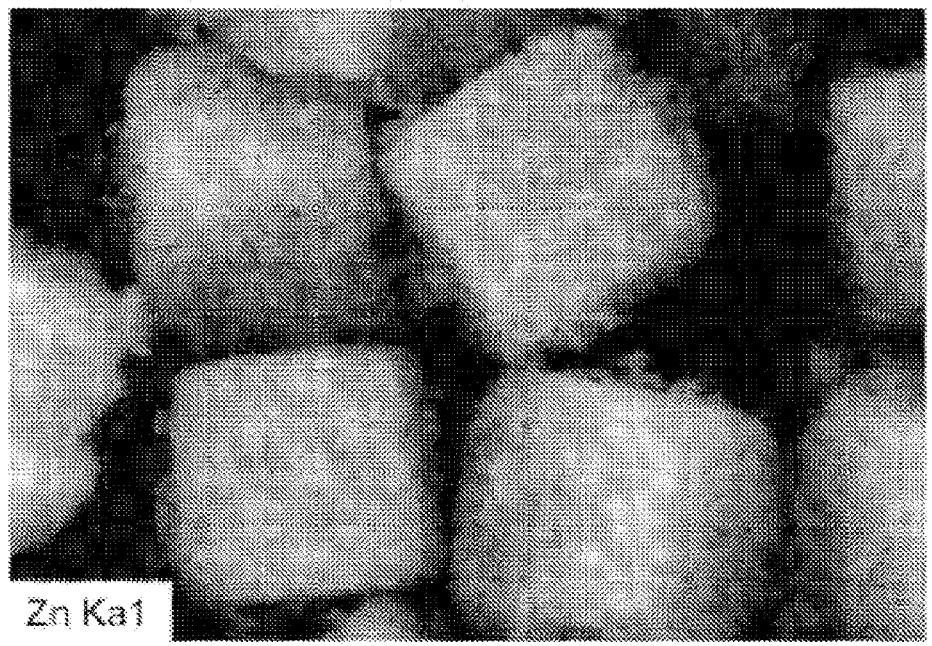
FIG. 2 is a photograph showing the distribution of Zn among the Zn—Sn hydroxide particles prepared in Example 1.
Figure 3:
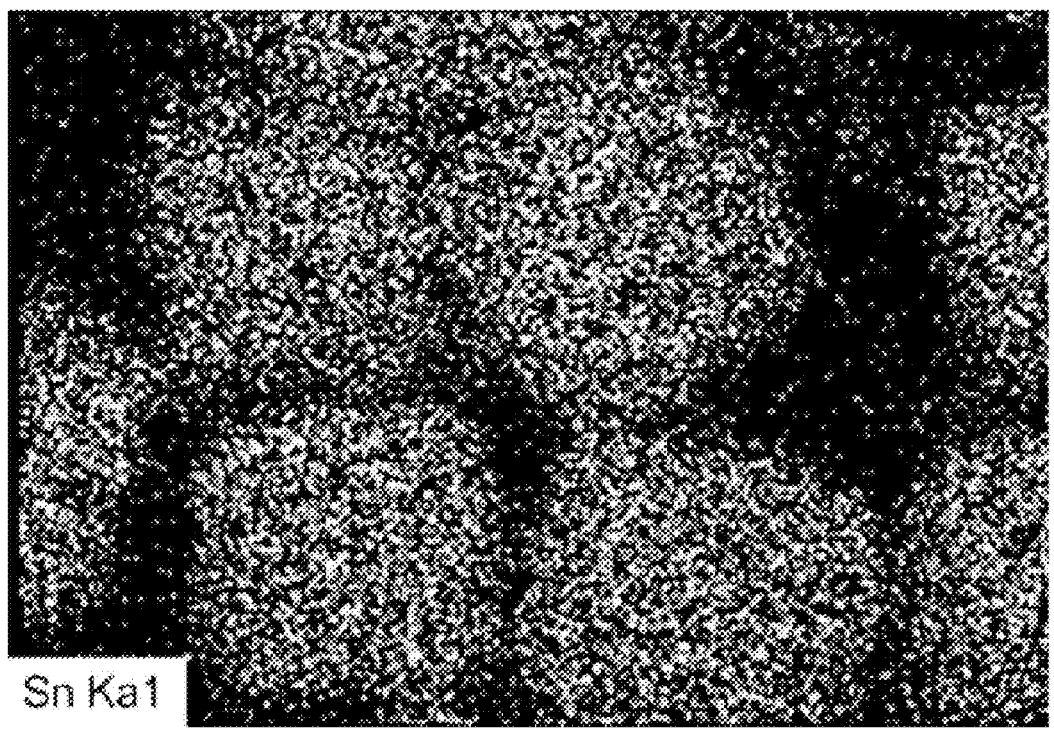
FIG. 3 is a photograph showing the distribution of Sn among the Zn—Sn hydroxide particles prepared in Example 1.

FIG. 2 is a photograph showing the distribution of Zn among the Zn—Sn hydroxide particles prepared in Example 1, and FIG. 3 is a photograph showing the distribution of Sn among the Zn—Sn hydroxide particles prepared in Example 1. In addition, FIG. 4 is a graph showing the composition ratio of Zn and Sn among the Zn—Sn hydroxide particles prepared in Example 1, the ratio measured through EDS mapping.

As illustrated in FIG. 2 and FIG. 3, in the Zn—Sn hydroxide particles prepared in Example 1, Zn and Sn were found to be evenly distributed throughout the particles.

Figure 4:
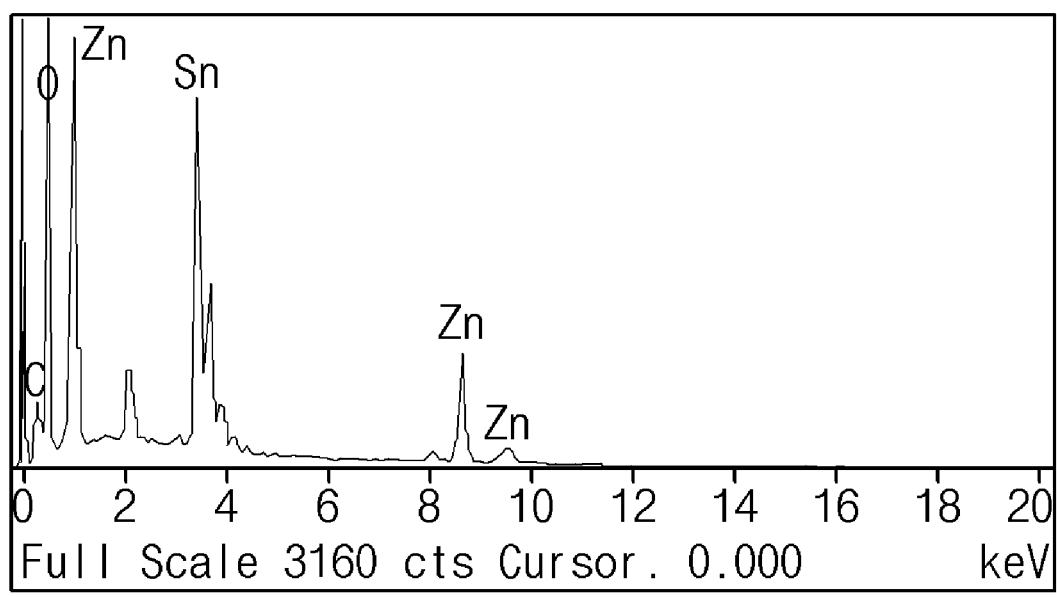
FIG. 4 is a graph showing the composition ratio of Zn and Sn among the Zn—Sn hydroxide particles prepared in Example 1, the ratio measured through EDS mapping.

In addition, using the graph of FIG. 4, the composition ratio of Zn and Sn in the Zn—Sn hydroxide particles was calculated, and according to the result of the calculation, the atomic ratio of Zn:Sn was about 1.25:1.

Figure 5:
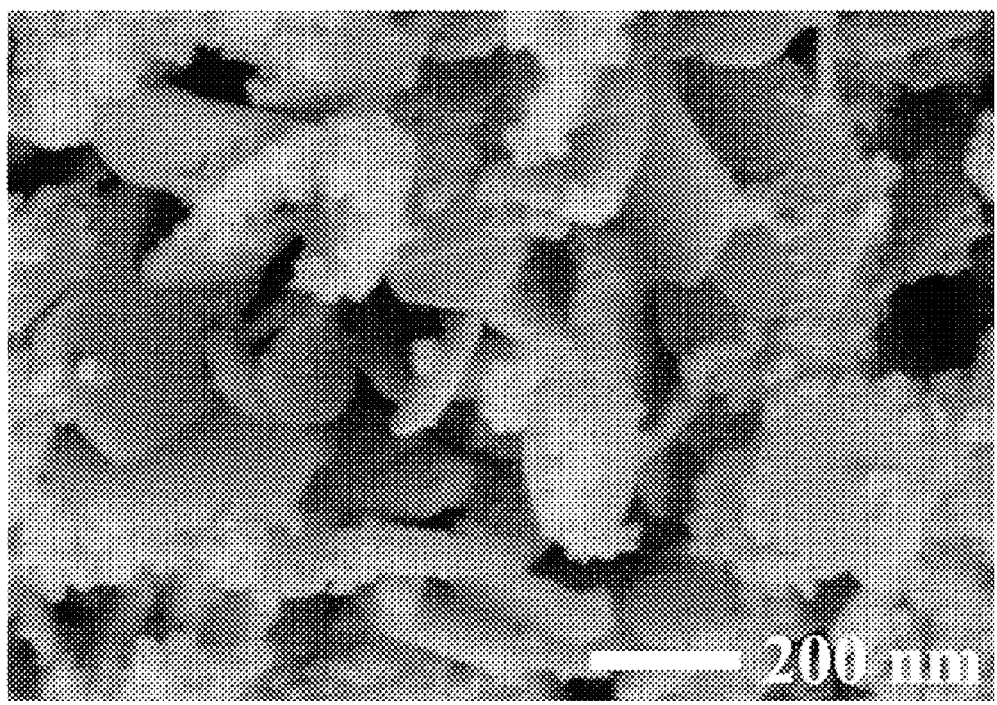
FIG. 5 is an SEM photograph of Zn—Al hydroxide particles prepared in Example 2.

FIG. 5 is an SEM photograph of Zn—Al hydroxide particles prepared in Example 2. As shown in FIG. 5, the Zn—Al hydroxide particles prepared in Example 2 were particles in a plate form having a thickness of about 20 nm and a dimension of about 250 nm×250 nm, and were found to have a relatively uniform particle size distribution.

Figure 6:
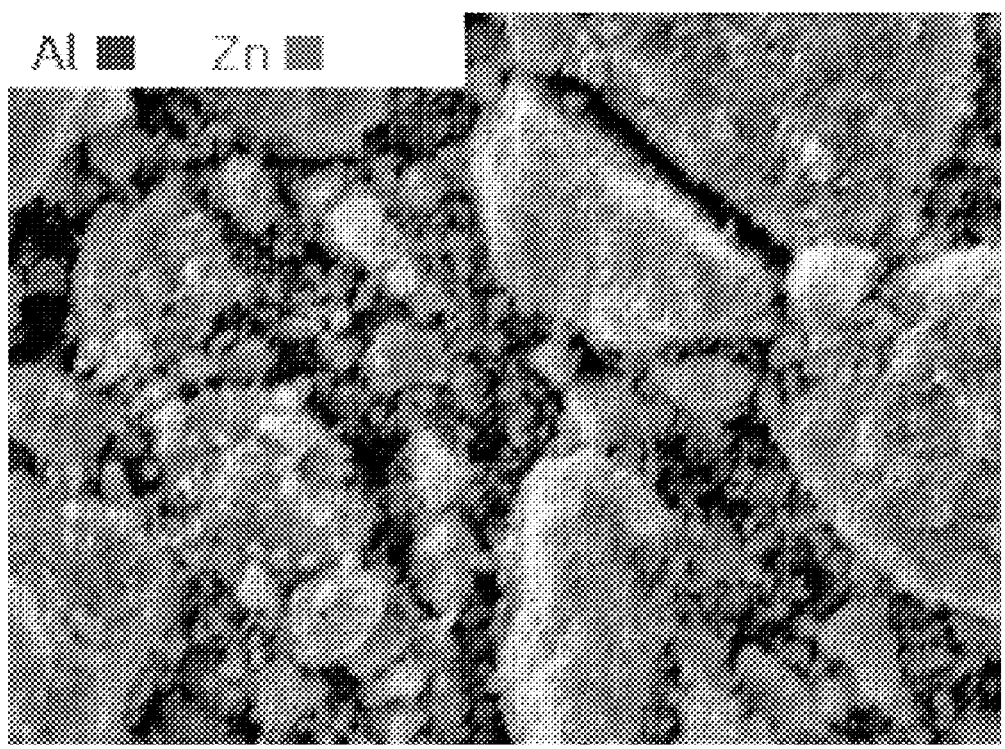
FIG. 6 is a photograph showing the distribution of Zn and Al among the Zn—Al hydroxide particles prepared in Example 2.

FIG. 6 is a photograph showing the distribution of Zn and Al among the Zn—Al hydroxide particles prepared in Example 2. As illustrated in FIG. 6, in the Zn—Al hydroxide particles prepared in Example 2, Zn and Al were found to be evenly distributed throughout the particles.

Figure 7:
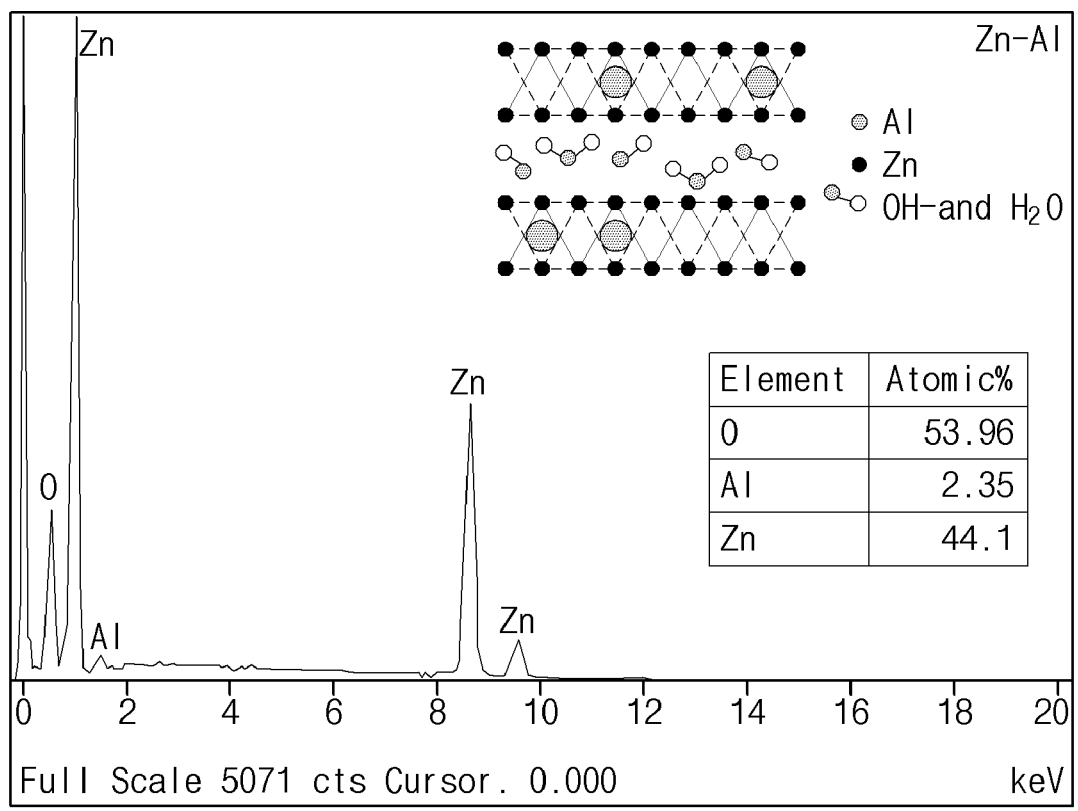
FIG. 7 is a graph showing the composition ratio of Zn and Al among the Zn—Al hydroxide particles prepared in Example 2, the ratio measured through EDS mapping.

In addition, FIG. 7 is a graph showing the composition ratio of Zn and Al among the Zn—Al hydroxide particles prepared in Example 2, the ratio measured through EDS mapping. Using the graph of FIG. 7, the composition ratio of Zn, Sn, Al in the Zn—Al hydroxide particles was calculated, and according to the result of the calculation, the atomic ratio of Zn:Al of the Zn—Al hydroxide of Example 2 was about 1.9:0.1, which was found to be a composition with a higher Zn content than a typical Zn—Al layered double hydroxide. The higher the ratio of Zn, the better the reactivity with Br of the flame retardant, so the performance as a flame retardant aid is excellent. In addition, when the Al content is high, when blended with the resin, the particles may be changed into an oxide form of Al2O3, thereby causing the degradation in the physical properties of the resin.

Experimental Example 2

The thermoplastic flame retardant resin compositions of Examples and Comparative Examples were uniformly mixed using a Henschel mixer, and then injected into a twin-screw extruder set at 220° C. and extruded to prepare a pellet. Thereafter, the pellet was injected through an injection machine to prepare a specimen, and the physical properties thereof were measured according to the following physical properties measurement method. Physical properties measurement results are shown in [Table 1] below.

<Method for Measuring Physical Properties>

(1) Thermal stability: The processing temperature was set to 230° C. during injection molding using an injection machine, and a resin was allowed to stay for 15 minutes. Thereafter, a specimen was prepared, and CIE Lab color coordinate values thereof were measured. The measured CIE Lab color coordinate values of the specimen and the CIE Lab color coordinate values of a reference specimen prepared without being allowed to stay were substituted into the following formula to measure a ΔE value.

$$\Delta E = \sqrt{(L'-L_O)^2 + (a'-a_0)^2 + (b'-b_0)^2}$$

In the formula above, L', a', and b' are L, a, b values obtained by measuring a specimen using a CIE Lab color coordinate system, the specimen prepared by allowing a resin to stay for 15 minutes at 230° C., and $L_0$, $a_0$, and $b_0$ are L, a, and b values obtained by measuring a specimen using a CIE Lab color coordinate system, the specimen prepared without being allowed to stay.

(2) Flame retardancy: The flame retardancy of a specimen having a thickness of 1/10 inch was evaluated according to the Ul 94 measurement method.

First, the specimen was contacted with a 20 mm high flame for 10 seconds, and then burn time t1 of the specimen was measured. Thereafter, when burning was over after a primary flame contact, the specimen was contacted with the flame again for 10 seconds, and then burn time t2 of the specimen was measured. When the sum of the t1 and the t2 is equal to or less than 50 seconds, the flame retardancy of the specimen was rated as a V-0 grade.

TABLE 1

|  | Thermal stability (ΔE) | Degree of flame retardancy |
| --- | --- | --- |
| Example 1 | 4.12 | V-0 |
| Example 2 | 5.04 | V-0 |
| Comparative Example 1 | 7.97 | V-0 |
| Comparative Example 2 | 11.85 | V-0 |

As shown in [Table 1] above, the flame retardant resin composition to which the flame retardant aid of each of Examples 1 and 2 prepared according to the method of the present invention was applied showed the same level of flame retardancy as the flame retardant resin composition of each of Comparative Examples 1 and 2 in which an antimony trioxide flame retardant aid was used, and had less color deterioration after being allowed to stay at a high temperature than the flame retardant resin composition of each of Comparative Examples 1 and 2 in which an antimony trioxide was used, and thus, was confirmed to be excellent in thermal stability.

The invention claimed is:
1. A flame retardant resin composition comprising:
a base resin; a halogen-based flame retardant comprising tetrabromobisphenol A, and a flame retardant aid, wherein the flame retardant aid is a multi-component metal hydroxide represented by Formula I below, and wherein the base resin comprises a conjugated diene-based graft copolymer, and a matrix copolymer, which is a copolymer of an aromatic vinyl-based monomer and a vinyl cyan-based monomer:

$$Zn_xM^1y(OH)_z \qquad \text{[Formula 1]}$$

wherein, in Formula 1 above,

M¹ is one or more selected from the group consisting of Al and Sn, x and y each represent the atomic ratio of Zn and M¹, x:y is 0.5 to 2.0:0.1 to 3.0, and $2 \leq z \leq 6$, wherein the flame retardant composition comprises 100 parts by weight of the base resin, 10 to 25 parts by weight of the halogen-based flame retardant, and 1 to 5 parts by weight of the flame retardant aid.

2. The flame retardant resin composition of claim 1, wherein the halogen-based flame retardant further comprises one or more selected from the group consisting of hexabromocyclododecane, tetrabromocyclooctane, monochloro petabromocyclohexane, decabromodiphenyl oxide, octabromodiphenyl oxide, decabromodiphenyl ethane, ethylene bis (tetrabromophthalimide), [tetrabromobisphenyl A,] brominated epoxy oligomers, bis(tribromophenoxy) ethane, 2,4, 6-tris(2,4,6-tribromophenoxy)-1,3,5-triazine, and tetrabromobisphenol A bis(allyl ether).

3. The flame retardant resin composition of claim 1, wherein the flame retardant aid is a multi-component metal hydroxide represented by [Formula 2] below:

$$Zn_xM^2_{y1}M^3_{y2}(OH)_z \qquad \text{[Formula 2]}$$

wherein, in Formula 2 above,

M² is one or more selected from the group consisting of Sn and Al,

M³ is one or more selected from the group consisting of transition metals, alkaline earth metals, and Group 13 to 16 metals excluding Zn, Sn, and Al, x, y1, and y2 each represent the atomic ratio of Zn, M², and M³, x:y1:y2 is 0.5 to 2.0:0.1 to 3.0:0 to 2.9, and $2 \leq z \leq 6$.

4. The flame retardant resin composition of claim 1, further comprising one or more selected from the group consisting of an impact modifier, a lubricant, an anti-dripping agent, an antioxidant, a stabilizer, a sunscreen, a pigment, and an inorganic filler.

5. The flame retardant resin composition of claim 1, wherein the flame retardant resin composition does not include an antimony-based flame retardant aid.

6. A flame retardant resin composition comprising:
a base resin;
a halogen-based flame retardant comprising tetrabromobisphenol A; and
a flame retardant aid, wherein the flame retardant aid is a multi-component metal hydroxide represented by [Formula 2] below, and wherein the base resin comprises a conjugated diene-based graft copolymer, and a matrix copolymer, which is a copolymer of an aromatic vinyl-based monomer and a vinyl cyan-based monomer:

$$Zn_xM^2_{y1}M^3_{y2}(OH)_z \qquad \text{[Formula 2]}$$

wherein, in Formula 2 above,

M² is Al,

M³ is one or more selected from the group consisting of Ti, Nb, Fe, Ni, Cu, Zr, Mo, Pd, Sc, Cd, Sr, Si and Sb, x, y1 and y2 each represent the atomic of Zn, M², and M³, x:y1:y2 is 0.5 to 2.0:0.1 to 3.0:0 to 2.9, wherein a non-zero amount of M³ is present, and $2 \leq z \leq 6$, wherein the flame retardant composition comprises 100 parts by weight of the base resin, 10 to 25 parts by weight of the halogen-based flame retardant, and 1 to 5 parts by weight of the flame retardant aid.

7. The flame retardant resin composition of claim 1, wherein the halogen-based flame retardant further comprises one or more selected from the group consisting of hexabromocyclododecane, tetrabromocyclooctane, monochloro petabromocyclohexane, decabromodiphenyl oxide, octabromodiphenyl oxide, decabromodiphenyl ethane, ethylene bis (tetrabromophthalimide), [tetrabromobisphenyl A,] brominated epoxy oligomers, bis(tribromophenoxy) ethane, 2,4, 6-tris(2,4,6-tribromophenoxy)-1,3,5-triazine, and tetrabromobisphenol A bis(allyl ether).

8. The flame retardant resin composition of claim 6, further comprising one or more selected from the group consisting of an impact modifier, a lubricant, an anti-dripping agent, an antioxidant, a stabilizer, a sunscreen, a pigment, and an inorganic filler.

9. The flame retardant resin composition of claim 6, wherein the flame retardant resin composition does not include an antimony-based flame retardant aid.

* * * * *